United States Patent
Palmer et al.

[11] Patent Number: 5,861,817
[45] Date of Patent: Jan. 19, 1999

[54] SYSTEM FOR, AND METHOD OF, DISPLAYING PRICES ON TAGS IN SUPERMARKETS

[75] Inventors: Douglas A. Palmer, 1229 Trieste Dr., San Diego, Calif. 92107; Marco Thompson, Rancho Santa Fe, Calif.

[73] Assignee: Douglas A. Palmer, San Diego, Calif.

[21] Appl. No.: 887,243

[22] Filed: Jul. 2, 1997

[51] Int. Cl.⁶ .................................................... G06K 7/00
[52] U.S. Cl. ............................... 344/825.35; 340/825.49; 340/825.54; 235/462; 235/472; 235/473; 342/44; 705/411
[58] Field of Search .................. 340/825.35, 825.49, 340/85.54; 705/400, 409, 411; 235/462, 472, 473, 383, 3; 342/44, 51

[56] References Cited

U.S. PATENT DOCUMENTS

| | | | |
|---|---|---|---|
| 4,500,880 | 2/1985 | Gomersall et al. | 340/825.35 |
| 4,821,291 | 4/1989 | Stevens et al. | 375/37 |
| 4,959,530 | 9/1990 | O'Connor | 235/383 |
| 4,962,466 | 10/1990 | Revesz et al. | 364/518 |
| 5,019,811 | 5/1991 | Olsson et al. | 340/825.17 |
| 5,065,002 | 11/1991 | Tashiro et al. | 235/472 |
| 5,111,196 | 5/1992 | Hunt | 340/825.35 |
| 5,120,941 | 6/1992 | Reilley et al. | 235/375 |
| 5,160,920 | 11/1992 | Harris | 340/765 |
| 5,198,644 | 3/1993 | Pfeiffer et al. | 235/383 |
| 5,345,071 | 9/1994 | Dumont | 235/383 |
| 5,361,871 | 11/1994 | Gupta et al. | 186/61 |
| 5,401,947 | 3/1995 | Poland | 235/383 |
| 5,424,524 | 6/1995 | Ruppert et al. | 235/462 |
| 5,442,343 | 8/1995 | Cato et al. | 340/825.35 |
| 5,457,307 | 10/1995 | Dumont | 235/383 |
| 5,461,561 | 10/1995 | Ackerman et al. | 364/401 |
| 5,465,085 | 11/1995 | Caldwell et al. | 340/825.35 |
| 5,473,146 | 12/1995 | Goodwin, III | 235/383 |
| 5,504,475 | 4/1996 | Houdou et al. | 340/825.35 |
| 5,532,465 | 7/1996 | Waterhouse et al. | 235/383 |
| 5,537,312 | 7/1996 | Sekiguchi et al. | 364/401 R |
| 5,544,041 | 8/1996 | Nekomoto | 364/401 |
| 5,548,282 | 8/1996 | Escritt et al. | 340/825.35 |
| 5,640,002 | 6/1997 | Ruppert et al. | 235/472 |

*Primary Examiner*—Brian Zimmerman
*Assistant Examiner*—Yonel Beaulieu
*Attorney, Agent, or Firm*—Ellsworth R. Roston; Fulwider Patton Lee & Utecht, LLP

[57] ABSTRACT

A handhold control unit (HCU) shaped like a gun includes a non volatile random access memory (RAM) for storing price information (e.g. price, price per ounce, sales discounts) for the items on the market shelves. The HCU receives such information from a central processing unit (CPU) in the market. When aimed at a stock keeping unit (SKU) tag adjacent a particular item on a shelf, the HCU interrogates the SKU tag to determine the item identity. The HCU may also provide photovoltaic energy to the SKU tag to provide for the SKU tag operation. The SKU tag responds with a code (preferably infra red) identifying the particular item and sends this code to the HCU as by infra red energy. The HCU then identifies the particular item in the RAM from the transmitted code and recovers from the RAM the price information relating to the particular item. The HCU then transmits to the SKU tag the code identifying the item and also the price information for the item. The SKU tag then recovers the transmitted information and compares the code in this information with the code identified by the SKU tag for the particular item. When the compared codes are identical, the SKU tag displays the price information for the particular item and sends an acknowledgement to the HCU that it has received such price information. The HCU stores this acknowledgement in the RAM and sends this acknowledgement to the CPU.

40 Claims, 3 Drawing Sheets

SYSTEM FOR, AND METHOD OF, DISPLAYING PRICES ON TAGS IN SUPERMARKETS

This invention relates to apparatus for, and methods of, providing price information for the different items in a market.

BACKGROUND OF THE INVENTION

A large supermarket may have as many as thirty five thousand (35,000) different items for sale. The items are generally disposed on shelves. Price tags are generally disposed below the items on the front of the shelves providing the support for the items. The tags are generally passive that is, they are prepared in advance and are affixed to the front of the shelves supporting the items. The tags may be made from a suitable material such as cardboard or a plastic and may be affixed to the shelves in a manner such that they can be easily removed from the shelves. The information on the tags may be typed or printed. This information may include the identity of the item, the supplier's or the stores trademark for the item, the price of the item, the price per unit (e.g. price per ounce or price per fluid unit) and any discount from a previously established price.

The prices of as many as ten percent (10%) of the items in a large supermarket are changed each week. This means that as many as thirty five hundred (3500) tags in a large supermarket may be changed manually each week. It is not uncommon to change the price of an item in the central processing unit in the market and to forget to change the price of the tag identifying the item. This creates confusion, particularly at the cashier's counter, in the operation of the supermarket and sometimes resentment in the minds of the customers. Often the supermarket may have to provide the customer with the price indicated on the tag even though the true price indicated in the supermarket's central processing unit is higher than such indicated price.

Passive tags on shelves as discussed above have vast acceptance because of apparent low cost and because of widespread use for a considerable number of years. The apparent low cost must be factored, however, with the large numbers of tags required to be changed weekly, the errors associated with the preparation of the new tags and the costs in preparing the new tags, in removing the outdated tags from the shelves and in affixing the updated tags to the shelves. For large supermarkets, the services of a clerk on a full time basis are often required to prepare the new tags, remove the outdated tags from the shelves and affix the updated tags to the shelves.

Various attempts have been made to replace the passive approach to updating tags as discussed above with an active approach to updating the tags. For example, active tags have been changed from a central station by radio frequency (RF) links. In these systems, the information for changing a tag is provided in the central processing unit and is transmitted by the central processing unit to the tag. The price presentation in the tag is then changed by circuitry in the tag in accordance with this transmitted information. A major problem with this system is that each tag has been powered by its own battery. As is well known, batteries have limited shelf lives. This has required considerable maintenance to replace defective or low powered batteries. Even with such considerable maintenance, the batteries are not replaced immediately after they fail. This has prevented price information from being presented on tags on shelves for items whose batteries have failed and have not been replaced.

Another active approach to updating tags in markets has been to use infra red energy. However, there have been problems of line of sight between the sources of the infra red energy and the tags energized by such sources. For example, the infra red sources have generally been overhead, usually at the ceilings in the supermarkets. As a result, there has often been a considerable distance between the infra red sources and the tags, particularly with respect to the tags on the lower shelves. Furthermore, there has been a problem with respect to the line of sight between the infra red sources and the tags on the shelves, particularly the tags on the lower shelves. These problems have required high powered infra red sources to be used and bright responses from the tags to be provided. When batteries have been used to power the tags in such systems employing infra red energy, the batteries have had short lives in view of the intensity of the infra red energy required.

Other systems have utilized coaxial lines, wires and/or fibers to transmit price information from a central processing unit to the different tags in a market. However, such systems have required extensive installations and have also required extensive maintenance after installation. Furthermore, such systems have also limited the positions where the tags can be located in the supermarket. For example, such systems do not allow simple, free-floating displays on store floors.

As will be seen, an active system has not been provided as yet which will meet all of the following criteria:
1. Low cost of installation;
2. Low cost of maintenance;
3. Low cost of operation;
4. No batteries in the tags;
5. Reliability of operation;
6. Simplicity of operation; and
7. A handheld unit including a memory for storing price information for the different items in a supermarket.

BRIEF DESCRIPTION OF THE INVENTION

This invention provides a system for use with active tags or labels in providing price information for the different items in a market. The system provides a low cost of installation and maintenance, particularly since the tags or labels operate independently of one another and do not require any wiring system throughout the market. Furthermore, batteries do not have to be used in the tags or labels. In view of the above, the system of this invention provides a low cost of operation. The system is also simple and reliable in operation.

In one embodiment of the invention, a handheld control unit (HCU) shaped like a gun includes a non volatile random access memory (RAM) for storing price information (e.g. price, price per ounce, sales discounts) for the items on the market shelves. The HCU receives such information from a central processing unit (CPU) in the market. When aimed a stock keeping unit (SKU) tag adjacent or below a particular item on a shelf, the HCU interrogates the SKU tag to determine the item identity. The HCU may also provide photovoltaic energy to the SKU to provide for the SKU operation. The SKU tag responds with a code (preferably infra red) identifying the particular item and sends this code as by infra red energy to the HCU.

The HCU then identifies the particular item in the RAM from the transmitted code and recovers from the RAM the price information relating to the particular item, the HCU then transmits to the SKU tag (preferably in an infra red beam) the code identifying the particular item and the price information for such item. The SKU tag then recovers the transmitted information and compares the code in this information with the code identified by the SKU tag for the particular item. When the compared codes are identical, the SKU tag displays the price information for the particular item and sends an acknowledgement to the HCU that it has received such price information. The HCU stores this acknowledgement in the RAM and sends this acknowledgement to the CPU.

DETAILED DESCRIPTION OF THE INVENTION

Figure 1:
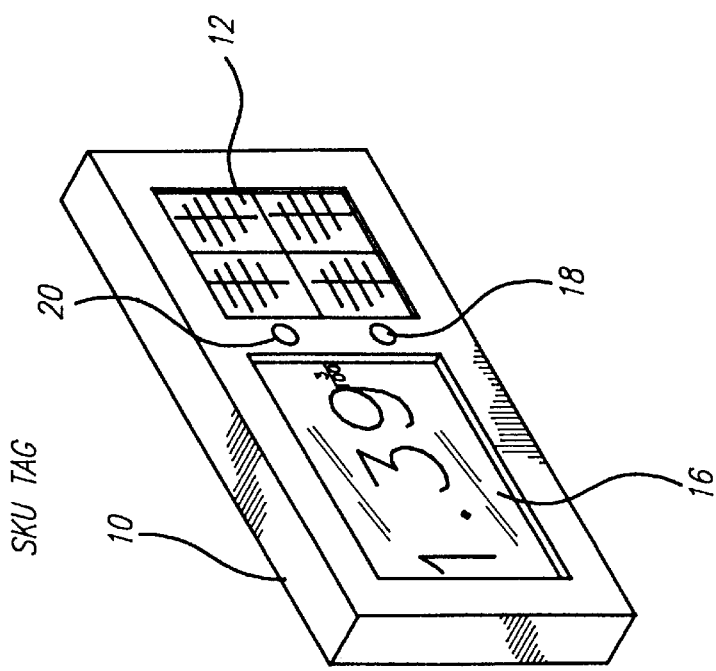
FIG. 1 is a schematic perspective view of a stock keeping unit (SKU) tag for displaying price information for an associated item (e.g. a can of pears in a market)

FIG. 1 schematically illustrates a stock keeping unit (SKU) tag, generally indicated at 10, for indicating price information for an item on a shelf in a market. The SKU tag 10 may be suitably attached to the front of a shelf or panel (not shown) for supporting the item, which may illustratively be a can of fruit or vegetables or a loaf of bread or any one of the numerous items which are sold in a market and which are displayed on the shelves in the market. The SKU tag 10 is disposed adjacent, and preferably immediately below, the item in a manner similar to the positioning of passive tags at present in supermarkets.

Figure 2:
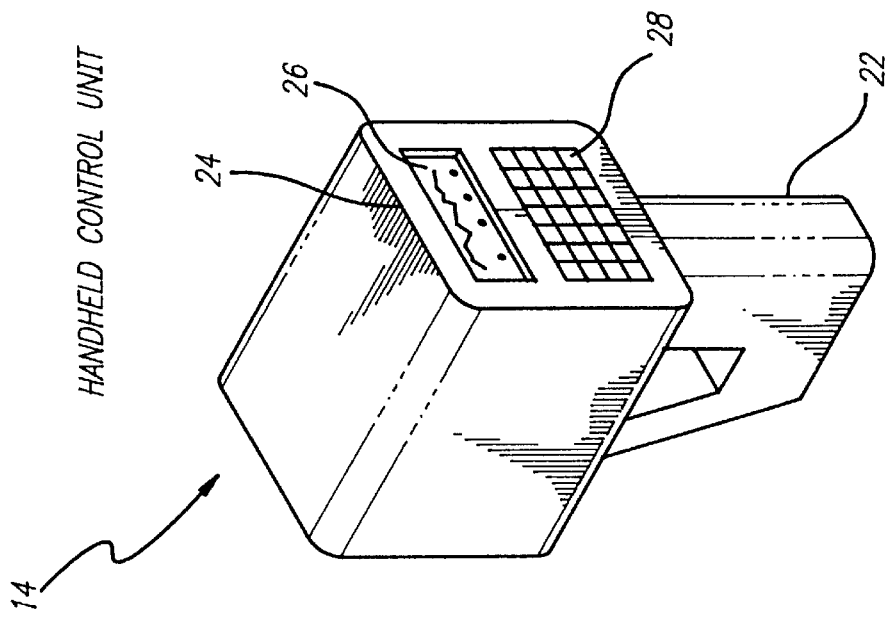
FIG. 2 is a schematic perspective view of a handheld control unit (HCU) for providing the price information to be displayed by the SKU tag shown in FIG. 1.

The tag 10 may include a photovoltaic cell 12 which may receive energy from the light in the market and may also receive energy from a handheld control unit (HCU) generally indicated at 14 in FIG. 2. The light received from the hand held control unit 14 may preferably be in the form of infra red energy. The light received by the photovoltaic cell 12 provides energy for obtaining an indication in a liquid crystal display 16 in the tag 10 of the identity of the item and the price information for the item. The identity of the item may include the trademark used by the supplier to identify the item. The price information may include the price of the item, the price per unit (e.g. per ounce or per fluid ounce) of the item and any special reductions in price from the price normally charged by the market for the item. The photovoltaic cell 12 or a portion of the cell may also be used as the light sensor for receiving information from the handheld control unit (HCU) 14.

The SKU tag 10 also includes a photodiode light sensor 18 for receiving binary signals, preferably in the form of infra red energy, from the handheld control unit 14. These binary signals indicate in coded form such information as the code identifying the item and the code identifying the price information for the item. The SKU tag 10 also includes a light emitting diode 20 for transmitting signals, preferably in the form of infra red energy and preferably in binary form, to the handheld control unit 14 for identifying in code the item associated with the tag 18.

The handheld control unit 14 is preferably in the form of a gun. It includes a handle 22 shaped to be gripped by the operator of the handheld control unit and it also includes a body 24. The body 24 contains a liquid crystal display 26 for indicating the identity of the item and the price information to be displayed on the SKU unit for such item. The liquid crystal display 26 may be constructed to "memorize" the display information so that refreshing is not required. A liquid crystal display 26 can also be provided which can be read out to return the information stored in the display.

The body 24 may also include a keypad 28 for providing for a manual entry into the handheld control unit 14 of the identity of the item and the price information for the item. This manual entry of price information may be provided to override price information stored in a memory in the body 24 of the handheld control unit 14. The memory will be described in detail subsequently.

Figure 3:
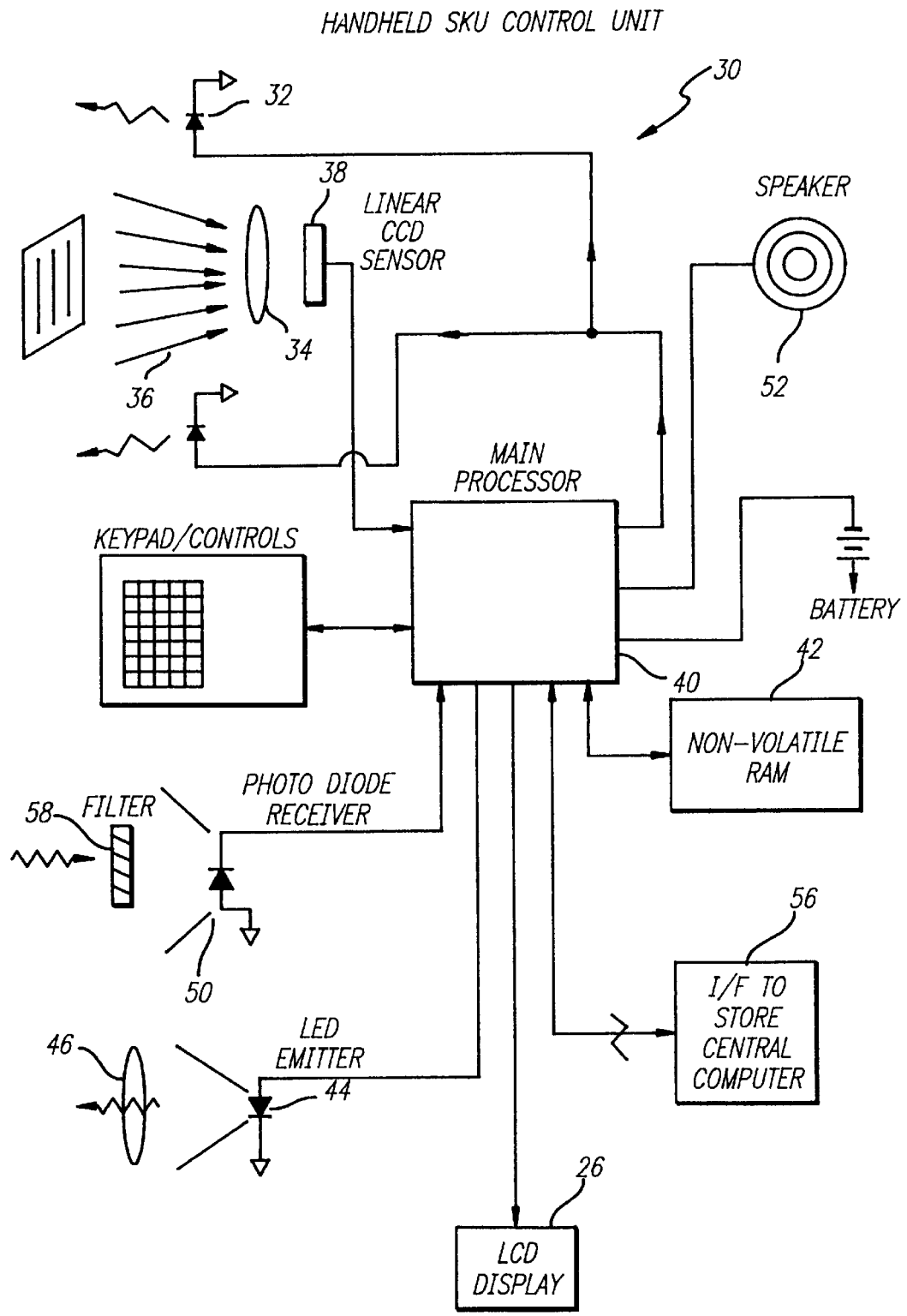
FIG. 3 is a circuit diagram, partially in block form, of an electronic system included in the hand held control unit shown in FIG. 2 for providing the price information to be displayed by the SKU tag shown in FIG. 1.

The electronic system in the handheld control unit 14 is generally indicated at 30 in FIG. 3. It includes a light emitting diode 32 for supplying light energy (preferably infra red energy) to the photovoltaic cell 12 in the SKU tag 10 and for illuminating the liquid crystal display panel 16 in the tag. Optics 34 are provided in the handheld control unit 30 to focus an image (schematically illustrated by arrows 36) of the tag 14 on a focal plane linear charge coupled display (CCD) 38 which registers the tag electronically.

The information sensed by the charge coupled display (CCD) 38 is passed to a main processor 40 which decodes such information into a suitable code such as a bar (UPC) code. This code is used for setting the tag identification into a shelf tag or to locate the price information for the tag 10 in a non volatile random access memory 42. The price information from the memory 42 is introduced to the main processor 40 which encodes this information into electronic signals which are introduced to a light emitting diode emitter 44. The light from the emitter 44 is focussed toward the tag 10 by a lens 46.

Infra red light from the tag 10 passes through a filter 48 which rejects background light in the market. The filtered light then passes to a photodiode receiver 50 which introduces the resultant signals to the main processor 40 as an acknowledgement from the tag 10 that the tag has received the price information from the handheld control unit 14. The receipt of this acknowledgement by the handheld control unit 14 may be indicated to the operator of the handheld control unit 14 as by a speaker 52. The receipt of this acknowledgement may also be displayed visually as by the liquid crystal 26 also shown in FIG. 2. The handheld control unit 14 may be powered by a battery 54.

When the handheld control unit 14 has been returned to its station in the market, it may download the acknowledgement for the different items in the market to the central processing unit (not shown) in the market through an interface 56. This interface may also be used to upload new price information from the central processing unit into the memory 40 in the handheld control unit 14. This new price information may be provided to change the prices in other tags in the market.

Figure 4:
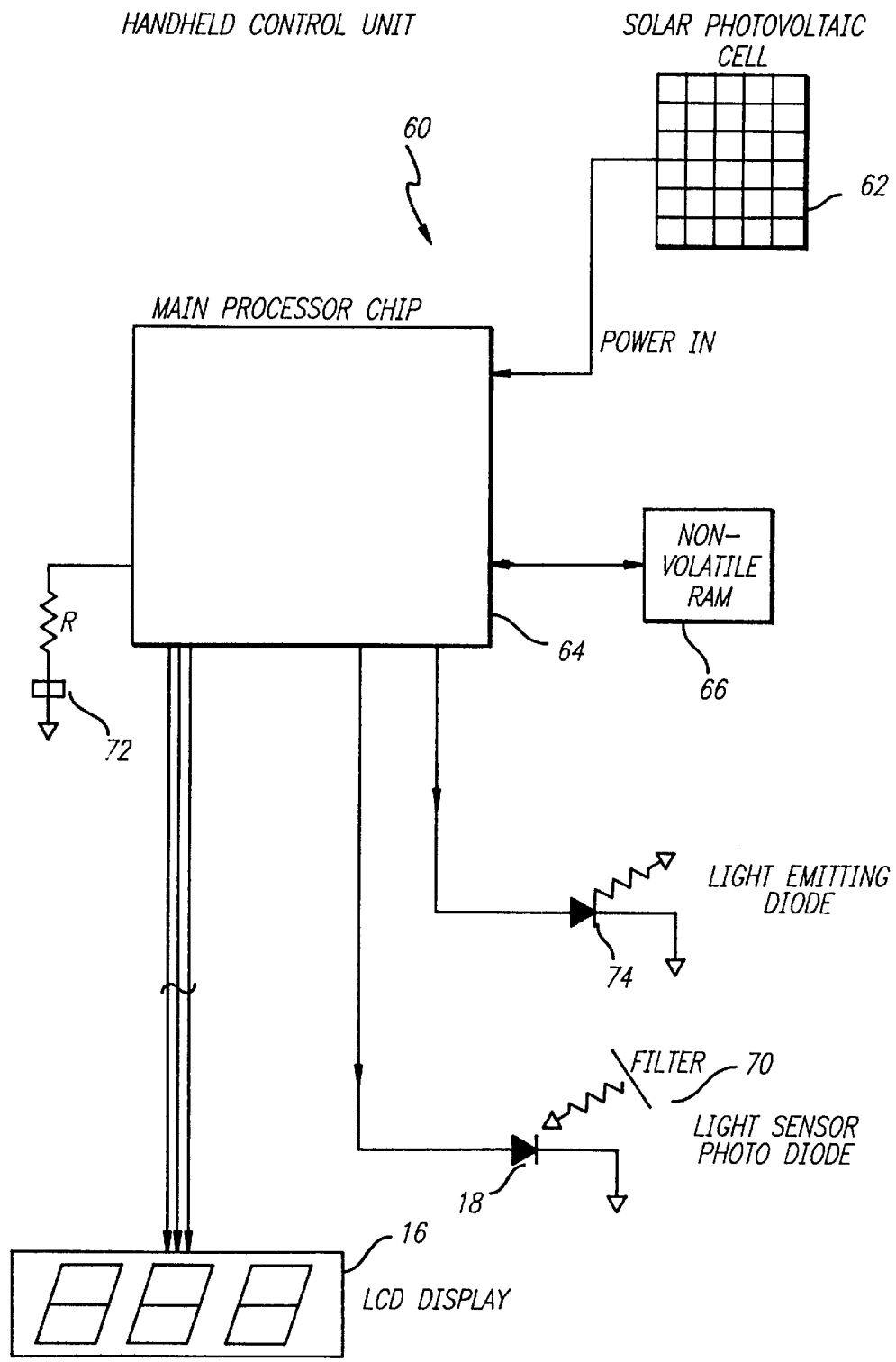
FIG. 4 is a circuit diagram, partially in block form, of an electronic system included in the SKU tag shown in FIG. 1 for displaying the price information for the associated item in the market.

The electronic system in the SKU tag 10 is generally indicated at 60 in FIG. 4. It may include a solar photovoltaic cell 62 which is powered from the light illumination in the market and from light illumination (preferably infra red) from the handheld control unit 14. The electronic system in the tag 10 also includes a main processor chip 64 and a non-volatile random access memory 66. The memory 66 stores in coded form the identity of the market item associated with the tag. The memory 66 also stores the price information received by the tag from the handheld control unit 14.

The price information is received by the tag 10 through the light sensor photodiode 18 (also shown in FIG. 1) after being filtered by a filter 70. This information is converted by the main processor chip 64 to a format for storage in the memory 66 and for display in the liquid crystal display panel 16 also shown in FIG. 1. An infra red light emitting diode 74 is also driven by the main processor chip 64 to provide feedback information from the tag 10 to the handheld control unit 14. A crystal oscillator 72 supplies the main processor chip 64 with signals at a particular frequency for driving a clock in real time for special processing, for driving the liquid crystal display 16, for sampling the infra red signal received by the photodiode light sensor 18 and for energizing the light emitting diode 74.

The handheld control unit 14 is initially pointed at the SKU tag 10 for interrogating the tag to determine the identity of the item associated with the tag. This interrogation is provided by signals provided by the light emitting diode 44 and passing through the lens 46 in FIG. 3. These signals are received by the light sensor photodiode 18 in the SKU tag 10 after passing through the filter 70 in FIG. 4. The main processor chip 64 in the SKU tag 10 processes these signals and introduces the processed signals to the memory 66 which then provides to the main processor chip the signals identifying the item.

The main processor chip 64 in the tag 10 processes the signals identifying the item in the memory 66 and introduces the processed information to the liquid crystal display 26. The main processor chip 64 in the tag 10 also introduces the processed signals to the light emitting diode 74 for transmission to the handheld control unit 14. These signals are received by the photodiode receiver 50 in the handheld control unit 14 after being filtered by the filter 48. The main processor 40 processes these signals and introduces the processed signals to the memory 42 for recovery of the price information relating to the item. This price information is processed by the main processor 40 and the processed information is transmitted to the tag 10. The transmitted information may include the identity of the item.

The tag 10 compares in the main processor chip 64 the item identity transmitted by the handheld control unit 14 with the identity of the item obtained from the memory 66. When the comparison is favorable, the tag 10 displays the price information in the liquid crystal display 16. The tag 10 also sends an acknowledgement to the handheld control unit that it has received and processed the price information from the handheld control unit 14.

The handheld control unit 14 records in the memory 42 that it has received the acknowledgement from the tag 14. When the handheld control unit 14 is returned to its station in the market, it downloads this information to the central processing unit at the station. It also uploads price information from the central processing unit for other market items whose prices have recently been changed.

The stock keeping unit tag for a particular item may be preprogrammed to provide certain price changes based upon a "global signal" broadcast throughout a market. For example, the stock keeping unit tag for the particular item may be preprogrammed to provide a ten percent (10%) price reduction when the "global signal" is broadcast throughout the market. The "global signal" may address all of the stock keeping units in the market or only selected groups of the stock keeping units in the market.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

We claim:

1. In combination for use in a market for providing price information for an item on a shelf in the market, a stock keeping unit tag constructed to be disposed on the market shelf for identifying the item and for providing price information concerning the item, a handheld control unit including a memory for storing price information relating to the item, first means in the stock keeping unit tag for identifying the item to the handheld control unit, second means in the handheld control unit for determining in the memory the item identified by the stock keeping unit tag, third means in the handheld control unit for transmitting to the stock keeping unit tag the price information provided in the memory in the handheld unit for such item, and fourth means in the stock keeping unit tag for displaying the price information for such item on the shelf.

2. In a combination as set forth in claim 1, fifth means in the stock keeping unit tag for identifying to the handheld control unit an acknowledgement that it has received the price information for the item from the handheld control unit.

3. In a combination as set forth in claim 2, sixth means in the handheld control unit for storing in the memory in the handheld control unit the acknowledgement from the stock keeping unit tag that the stock keeping unit tag has received from the handheld control unit the price information relating to the item.

4. In a combination as set forth in claim 1, fifth means in the handheld control unit for interrogating the stock keeping unit tag to determine the identity of the item in the stock keeping unit tag before the stock keeping unit tag identifies such item.

5. In a combination as set forth in claim 2, sixth means in the handheld control unit for storing in the memory in the handheld control unit the acknowledgement from the stock keeping unit tag the acknowledgement that such tag has received from the handheld control unit the price information relating to the item, and seventh means in the handheld control unit for providing an indication that it has received the acknowledgement from the stock keeping unit tag of the receipt by the stock keeping unit tag of the price information relating to the item.

6. In combination for use in a stock keeping unit tag in a market for providing price information for an item on a shelf in the market in accordance with price information provided by a handheld control unit, first means in the stock keeping unit tag for identifying the item, second means in the stock keeping unit tag for receiving an interrogation from the handheld control unit to identify the item, third means in the stock keeping unit tag for transmitting to the handheld control unit the identification of the item upon receiving the interrogation from the handheld control unit, fourth means responsive in the stock keeping tag unit to the reception of the price information for the item from the handheld control unit for recording such price information in the stock keeping unit tag, and fifth means in the stock keeping unit tag for acknowledging to the handheld control unit that it has received the price information relating to the item from the handheld control unit.

7. In a combination as set forth in claim 6, a photovoltaic cell in the stock keeping unit tag for providing power for operating the stock keeping unit tag, the photovoltaic cell being constructed and disposed to receive energy from the light in the market and from light from the handheld control unit.

8. In a combination as set forth in claim 6, a non volatile random access memory in the stock keeping unit tag for storing the price information provided to the stock keeping unit tag by the handheld control unit for the item.

9. In a combination as set forth in claim 8, a liquid crystal display provided in the stock keeping unit tag for displaying the price information provided in the non volatile random access memory for the item.

10. In a combination as set forth in claim 6, a light sensor in the stock keeping unit tag for receiving the price information provided by the handheld control unit for the item.

11. In a combination as set forth in claim 7, a light sensor in the stock keeping unit tag for receiving the price information provided by the handheld control unit for the item, a non volatile random access memory in the stock keeping unit tag for storing the price information provided to the stock keeping unit tag by the handheld control unit for the item, and a liquid crystal display provided in the stock keeping unit tag for displaying the price information provided in the non volatile random access memory for the item.

12. In combination for use in a market for providing price information for an item on a shelf in the market, the price information being provided by a stock keeping unit tag disposed adjacent the item on the shelf, a handheld control unit including:

first means in the handheld control unit for interrogating the stock keeping unit tag to determine the identity of the item on the shelf in the market, second means in the handheld control unit for receiving from the stock keeping unit tag information identifying the item on the shelf in the market and for processing such received information to identify the item, a non volatile memory in the handheld control unit for storing the identity of the item and price information relating to the item, third means in the handheld control unit for identifying the item and the price information relating to the item in the non volatile memory, fourth means in the handheld control unit for transmitting to the stock keeping the tag unit price information stored in the non volatile memory relating to the item.

13. In a combination as set forth in claim 12, fifth means in the handheld control unit for receiving an acknowledgement from the stock keeping unit tag of the reception by the stock keeping unit tag from the handheld control unit of the price information relating to the item.

14. In a combination as set forth in claim 13, sixth means in the handheld control unit for storing in the non volatile memory the acknowledgement by the stock keeping unit tag of the reception by the stock keeping unit tag of the price information relating to the item.

15. In a combination as set forth in claim 14, there being a central processing unit in the market, means in the handheld control unit for transmitting to the central processing unit in the market the acknowledgement stored in the non volatile memory in the handheld control unit that the stock keeping unit tag has received the price information from the handheld control unit relating to the item.

16. In a combination as set forth in claim 12, means in the handheld control unit for displaying the price information relating to the item and transmitted by the handheld control unit to the stock keeping unit tag.

17. In combination for use in a market for providing price information for a particular item on a shelf in the market, a stock keeping unit tag constructed to be disposed on the market shelf for identifying the item and for providing price information concerning the item, a handheld control unit, means in the handheld control unit for providing photovoltaic energy to the stock keeping unit tag for obtaining an operation of the stock keeping unit tag, means in the handheld control unit for providing a light interrogation to the stock keeping unit tag to obtain an identification of the particular item by the stock keeping unit tag, means in the handheld control unit for receiving a light transmission from the stock keeping unit tag of the identification of the particular item on the shelf in the market, memory means in the handheld control unit for storing price information for all of the items on the shelves in the market, means responsive in the handheld control unit to the identification from the stock keeping unit tag of the particular item on the shelf in the market for transmitting light relating to price information of the particular item, and means responsive in the stock keeping unit tag to the transmission of the price information relating to the particular item for visually displaying such price information in the stock keeping unit tag.

18. In a combination as set forth in claim 17, means responsive in the stock keeping unit tag to the reception from the hand held control unit of the price information relating to the particular item on the shelf for transmitting to the handheld unit control light providing an acknowledgement that the stock keeping unit tag has received such price information.

19. In a combination as set forth in claim 18, means responsive in the handheld control unit to the light information acknowledging the reception by the stock keeping unit tag of the price information relating to the particular item for storing such acknowledgement in the memory means.

20. In a combination as set forth in claim 19, a central processing unit being provided in the market, and means in the handheld control unit for transmitting to the central processing unit the information stored in the memory means relating to the acknowledgement by the stock keeping unit tag that it has received the price information relating to the particular item.

21. In a combination as set forth in claim 18, means in the handheld control unit for providing an indication to an operator of the handheld control unit that the handheld control unit has received the acknowledgement from the stock keeping unit tag.

22. In a combination as set forth in claim 21, means in the handheld control unit for displaying the price information relating to the item and transmitted by the handheld control unit to the stock keeping unit tag.

23. In a method of providing price information relating to a particular item on a shelf in a market, the steps of:

providing a handheld control unit having a memory for storing price information relating to the particular item and other items on shelves on the market, providing a stock keeping unit tag for disposition adjacent the particular item to provide price information relating to the particular item, providing an interrogation from the handheld control unit to the stock keeping unit tag of the identity of the particular item, providing an identification by the stock keeping unit tag, in response to such interrogation by the stock keeping unit tag to the handheld control unit, of the identity of the particular item, providing a memory in the hand held control unit of price information relating to different items in the market including the particular item, providing a determination from the memory of the price information relating to the particular item, providing a transmission to the stock keeping unit tag of the price information determined from the memory relating to the particular item, and providing a display in the stock keeping unit tag of the price information transmitted to the stock keeping unit tag and relating to the particular item.

24. In a method as set forth in claim 23, the step of:

providing an acknowledgement from the stock keeping unit tag to the handheld control unit that the stock keeping unit tag has received the price information relating to the particular item.

25. In a method as set forth in claim 24, the step of:

storing in the memory in the handheld control unit the acknowledgement that the stock keeping unit tag has received the price information relating to the particular item.

26. In a method as set forth in claim 25, the steps of:

providing a central processing unit in the market, and transmitting to the central processing unit the acknowledgement stored in the memory in the handheld control unit that the stock keeping unit tag has received the price information relating to the particular item.

27. In a method as set forth in claim 20, the steps of:

providing a photovoltaic cell at the stock keeping unit tag to operate the stock keeping unit tag, and providing energy from the handheld control unit and from light in the market to energize the photovoltaic unit.

28. In a method as set forth in claim 23 wherein light is transmitted between the stock keeping unit tag and the hand held control unit to provide the interrogation of the stock keeping unit tag, the transmission to the handheld control unit of the identity of the particular item, the transmission of price information to the stock keeping unit tag and the acknowledgement to the handheld control unit by the stock keeping unit tag that the stock keeping unit tag has received the price information relating to the item.

29. In a method as set forth in claim 27, providing an acknowledgement from the stock keeping unit tag to the handheld control unit that the stock keeping unit tag has received the price information relating to the particular item from the handheld control unit, storing in the memory the acknowledgement that the stock keeping unit tag has received the price information relating to the particular item.

30. In a method for use in a market for providing price information in a handheld control unit to a stock keeping unit tag relating to price information for an item adjacent the stock keeping unit tag on a shelf in the market, the steps in the handheld control unit of:

providing a memory in the handheld control unit for storing the price information relating to the item, interrogating the stock keeping unit tag to determine the identity of the item, receiving the identity of the item from the stock keeping unit, determining the price information relating to the item from the memory, and transmitting the price information relating to the item to the stock keeping unit tag.

31. In a method as set forth in claim 30, the steps in the handheld control unit of:

receiving an acknowledgement from the stock keeping unit tag that the stock keeping unit tag has received the price information relating to the item, and storing the acknowledgement in the memory in the handheld control unit.

32. In a method as set forth in claim 30, the step in the handheld control unit of:

transmitting to a central processing unit in the market the acknowledgement stored in the memory that the stock keeping unit tag has received the price information relating to the item.

33. In a method as set forth in claim 30, the step in the handheld unit tag of:

providing to the stock keeping unit tag photovoltaic energy to operate the stock keeping unit tag.

34. In a method for use in a market for providing price information in a handheld control unit to a stock keeping unit tag relating to price information for an item adjacent the stock keeping unit tag on a shelf in the market, the steps in the stock keeping unit tag of:

receiving an interrogation from the handheld control unit to determine the identity of the item, transmitting the identity of the item to the handheld control unit, receiving price information relating to the item from the handheld control unit, and displaying the price information relating to the item in the stock keeping unit tag.

35. In a method as set forth in claim 34, the steps in the stock keeping unit tag of:

providing a photovoltaic cell for operating the stock keeping unit, and receiving photovoltaic energy from the handheld control unit and from light in the market to energize the photovoltaic cell to obtain the operation of the stock keeping unit tag.

36. In a method as set forth in claim 34, the step in the stock keeping unit tag of:

providing an acknowledgement to the handheld control unit that it has received from the handheld control unit the price information relating to the item.

37. In a method as set forth in claim 34, the steps in the stock keeping unit tag of:

storing in a memory in the stock keeping unit tag the identity of the item, and comparing the identity of the stem in the memory with the identity of the item transmitted from the handheld control unit to the stock keeping unit tag to verify that the price information transmitted from the handheld control unit to the stock keeping unit tag relates to the item.

38. In a combination as set forth in claim 7 wherein the photovoltaic cell is included in the fourth means for receiving the price information for the unit from the handheld control unit.

39. In a combination as set forth in claim 6, the stock keeping unit tag being preprogrammed to provide a particular price change in the stock keeping unit tag when a "global signal" requesting such price change is broadcast throughout the market.

40. In a combination as set forth in claim 11 wherein the liquid crystal display is constructed to memorize the price information so that refreshing of such information is not required.

* * * * *